United States Patent

Baker et al.

[11] 3,910,891
[45] Oct. 7, 1975

[54] SEPARATION OF α-AMINO-ω-LACTAMS FROM BECKMANN REARRANGEMENT MIXTURES

[75] Inventors: Josefina T. Baker, Mount Tabor; Robert Fuhrmann, Morris Plains; Fred W. Koff, Long Valley; John Pisanchyn, Morristown, all of N.J.

[73] Assignee: Allied Chemical Corporation, New York, N.Y.

[22] Filed: June 6, 1974

[21] Appl. No.: 477,131

[52] U.S. Cl. ............ 260/239.3 R; 260/293.86; 260/326.5 FL
[51] Int. Cl.² ............ C07D 223/12; C07D 207/14; C07D 211/56
[58] Field of Search ............ 260/239.3 R, 293.86, 260/326.5 FL

[56] References Cited
UNITED STATES PATENTS
3,641,003  2/1972  Ito et al. .................... 260/239.3 R Primary Examiner—Norma S. Milestone
Assistant Examiner—Robert T. Bond
Attorney, Agent, or Firm—Roger H. Criss; Arthur J. Plantamura

[57] ABSTRACT

A process provided for separating an α-amino-ω-lactam of the formula:

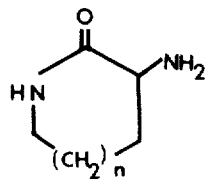

wherein $n$ is an integer from 0 to 12, in its free form from the rearranged mixture obtained by the Beckmann rearrangement of an α-aminocycloalkanone oxime of the formula:

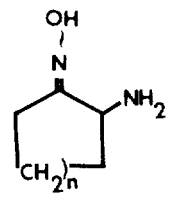

wherein $n$ is an integer from 0 to 12, which process comprises the steps of:
contacting the rearranged mixture with a solvent selected from the group consisting of:
a. linear and cyclic ethers and polyethers,
b. $C_3$ to $C_8$ alcohols in the absence of chloride ions,
c. nitriles containing two or more carbon atoms,
d. aromatics and haloaromatics in the presence of at least one of said (a) or (b), wherein the halo substituent is chlorine or bromine and is attached directly to the ring,
e. chloroform,
f. trichloroethylene in the presence of at least one of said (a) or (b), and
g. mixtures of two or more of the above, while simultaneously neutralizing the resultant solution with an excess of anhydrous ammonia based on the hydrogen ion concentration in the solution, whereby an insoluble ammonium salt precipitate is formed; and
separating a solution containing an α-amino-ω-lactam in its free form from the precipitate.

14 Claims, No Drawings

SEPARATION OF ALPHA-AMINO-OMEGA-LACTAMS FROM BECKMANN REARRANGEMENT MIXTURES

BACKGROUND OF THE INVENTION

1. Field of the Invention

This invention relates to the recovery of α-amino-ω-lactams, particulary α-amino-ε-caprolactam from Beckmann rearrangement mixtures.

2. Description of the Prior Art

It is known that α-amino-ω-lactams are obtained when α-aminocycloalkanone oximes are subjected to the Beckmann rearrangement. For example, α-amino-ε-caprolactam is obtained by the Beckmann rearrangement with α-aminocyclohexanone oxime utilizing, for example, sulfuric acid. The α-amino-ε-caprolactam can be resolved and then hydrolyzed to the amino L-lysine, demand for which has been increasing rapidly.

If α-aminocyclohexanone oxime is utilized as a source of α-amino-ε-caprolactam, it is necessary to isolate the α-amino-ε-caprolactam from the α-amino-ε-caprolactam-acid Beckman rearrangement mixture. It has previously been suggested to neutralize this mixture with ammonia in order to isolate the free basic α-amino-ε-caprolactam. Although it is known that ε-caprolactam can be formed from the Beckmann rearrangement mixture of cyclohexanone oxime by neutralizing the rearranged mixture with ammonia and that the ε-caprolactam phase can easily be isolated from the ammonium acid salt solution phase (e.g., ammonium sulfate), such procedures generally cannot be utilized in the recovery of α-amino-ε-caprolactam from the Beckmann rearrangement of α-aminocyclohexanone oxime with sulfuric acid or the like or in the recovery of other α-amino-ω-lactams. This is because the amino group considerably increases the solubility of aminolactams in water.

It has been proposed in Japanese patent publication 42074 (1973) to isolate α-amino-ε-caprolactam from the liquid mixture obtained by the Beckmann rearrangement of α-aminocyclohexanone oxime with sulfuric acid by a process which includes diluting the liquid mixture with water, adjusting the pH of the liquid to above 10 by bubbling in ammonia gas (or utilizing aqueous ammonia) whereby ammonium sulfate and free α-amino-εcaprolactam are formed, extracting the α-amino-εcaprolactam with phenol or chloroform solvent and thereafter evaporating the solvent to obtain the free α-amino-εcaprolactam. This patent discloses that other organic solvents cannot be so utilized. However, this proposed process does not appear attractive because the extraction step must be carried out within a short period of time following neutralization since, at the basic pH employed, side reactions such as ring opening can occur. The ring opening side reaction is more pronounced in aqueous systems. Moreover, when phenol is employed as the solvent, it is difficult to purify the α-amino-ε-caprolactam therefrom by fractionation. Furthermore, the use of an aqueous neutralization medium necessitates the handling of fairly dilute solutions and large amounts of organic solvent.

A similar process is disclosed in Japanese patent publication 42075 (1973) except that subsequent to diluting with water and neutralizing with ammonia to a pH above 10, methanol or ethanol is added to the solution and ammonium sulfate precipitates out. The amount of methanol or ethanol employed is 40 to 90% of the total alcohol/water in the system. Such a process likewise requires a large amount of water and organic solvent and results in an aqueous mixture which must be dried to remove impurities if the α-amino-εcaprolactam is to be subjected to chemical resolution in the next step in the process of forming lysine. Furthermore, the aqueous alcohol solution will contain appreciable amounts of unprecipitated ammonium sulfate. This requires total evaporation of the water and alcohol since α-amino-ε-caprolactam is highly soluble in water.

U.S. Pat. No. 3,641,003 to Ito et al. suggests a particular catalyst useful in the Beckmann rearrangement of α-aminocyclohexanone and discloses that α-amino-ε-caprolactam in the hydrochloride form can be recovered from the reaction mixture by adding water, neutralizing with ammonium hydroxide, passing the solution through a strongly acidic cation exchange resin which absorbs the α-amino-ε-caprolactam, washing the resin with water, eluting the α-amino-ε-caprolactam from the resin with aqueous ammonia, evaporating to dryness, dissolving in a polar organic solvent and passing hydrogen chloride gas therethrough. The disadvantages of this proposed process include the use of large amounts of water, production of aqueous salts in the regeneration of the ion exchange resin and high capital and energy costs.

SUMMARY OF THE INVENTION

In accordance with this invention, a process is provided for separating an α-amino-ω-lactam of the formula:

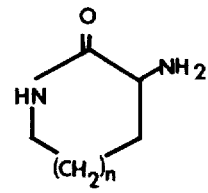

wherein n is an integer from 0 to 12, in its free form from the rearranged mixture obtained by the Beckmann rearrangement of an α-amino-cycloalkanone oxime of the formula:

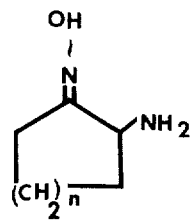

wherein n is an integer from 0 to 12, which process comprises the steps of:

contacting the rearranged mixture with a solvent selected from the group consisting of
a. linear and cyclic ethers and polyethers,
b. $C_3$ to $C_8$ alcohols in the absence of chloride ions,
c. nitriles containing two or more carbon atoms,
d. aromatics and haloaromatics in the presence of at least one of said (a) or (b), wherein the halo substituent is chloride or bromine and is attached directly to the ring,
e. chloroform, f. trichloroethylene in the presence of at least one of said (a) or (b), and g. mixtures of two or more of the above, while simultanously neutralizing the resultant solution with an excess of anyhdrous ammonia based on the hydrogen ion concentration in the solution, whereby an insoluble ammonium salt precipitate is formed; and Separating a solution containing an α-amino-ω-lactam in its free form from the precipitate.

The α-amino-ω-lactam may subsequently be recovered from the resulting solution. In a preferred embodiment of the invention, the α-amino-ω-lactam is α-amino-ε-caprolactam and the α-aminocyclo-alkanone oxime is α-aminocyclohexanone oxime. The process of this invention may be carried out on a continuous or batch basis. It is preferred to add about 0.5 to 2 moles of water per mole of α-amino-ω-lactam to the solvent prior to neutralization. This results in discrete, non-sticky crystals being formed which are easier to handle and do not agglomerate.

The process of this invention provides high yields of the α-amino-ω-lactam such as α-amino-ε-caprolactam without the disadvantages mentioned above with respect to previously suggested techniques, namely side reactions such as ring opening, the use of large amounts of water and organic solvents and the difficulty in extracting α-amino-ε-caprolactam from alkaline aqueous solutions.

DESCRIPTION OF THE PREFERRED EMBODIMENTS

The starting material of the process of this invention is the rearranged mixture of the Beckmann rearrangement of an α-aminocycloalkanone oxime. The α-aminocycloalkanone oximes are of the formula:

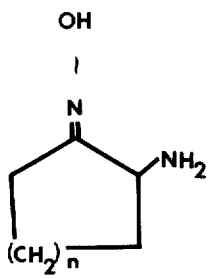

wherein n is an integer from 0 to 12, preferably 1 to 8 and most preferably 2 (i.e., α-aminocyclohexanone oxime). Examples of such oximes include α-aminocyclopentanone oxime, α-aminocyclohexanone oxime, α-aminocycloheptanone oxime, α-aminocyclooctanone oxime, α-aminocyclonoanone oxime, α-aminocyclodecanone oxime, α-aminocyloundecanone oxime and α-aminocyclododecanone oxime. The α-aminocycloalkanone oxime may be in its free form or its salt form, such as the hydrochloride, sulfate, acetate or other acid salts.

In the Bechmann reaction, the α-aminocycloalkanone oxime is rearranged to the corresponding α-amino-ω-lactam by reaction with a Beckmann reagent (transposition agent). Preferred Beckmann reagents which may be employed include sulfuric acid, fuming sulfuric acid, liquid $SO_2$ containing $SO_3$ as disclosed in U.S. Pat. application Ser. No. 433,967 of Fuhrmann, Tunick and Sifniades filed Jan. 16, 1974, (entitled "Rearrangement of Aminocycloalkanone Oximes to the Corresponding Lactam") and polyphosphoric acid optionally containing catalytic amounts of HCl as disclosed in U.S. Pat. application Ser. No. 391,369 filed Aug. 21, 1973 of Tunick and Pisanchyn (entitled "Rearrangement of α-Aminocycloalkanone Oximes"), now abandoned. The reaction conditions utilizing sulfuric or fuming sulfuric acid are generally known. For example, about 2 to 9 moles of the acid, of a concentration of about 100 to 115%, per mole of α-aminocyclohexanone oxime may be employed at reaction temperatures in the range of about 65° to 110°C. Reaction conditions with $SO_3$ in liquid $SO_3$ or polyphosphoric acid as the transposition agent are disclosed in the aforementioned patent applications, which are incorporated herein by reference. Preferred acids are sulfuric acid and polyphosphoric acid. In the neutralization zone, the above reagents by themselves or in the presence of water yield hydrogen ions.

The α-amino-ω-lactam which are formed by the above Beckmann rearrangement have the formula:

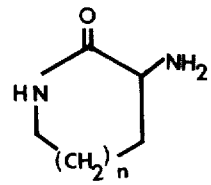

wherein n has the meaning given above. The preferred α-amino-ω-lactam is α-amino-ε-caprolactam. The α-aminocyclohexanone oxime starting material may be prepared in a conventional manner, such as amination of the corresponding chloronitroso cycloalkane dimer as disclosed, for example, in British Pat. No. 1,279,906 or amination of the corresponding α-chlorocycloalkanone in the presence of hydroxylamine as disclosed, for example, in U.S. Pat. No. 3,426,070 or chlorination of the corresponding cycloalkylamines followed by Neber rearrangement and conversion to the oxime as disclosed in, for example, the aforementioned U.S. Pat. No. 3,641,003. The rearranged mixture is generally in a liquid form and contains the rearrangement acid, α-amina-ε-caprolactam in combined form (e.g., sulfate) as well as impurities.

Although in the following description reference is specifically made to α-amino-ε-caprolactam, it is to be understood that other lactams having the above formula are also intended and that the process is equally applicable thereto.

In accordance with the process of this invention, the Beckmann rearranged mixture (the α-amino-ε-caprolactam mixture) is dissolved in a solvent selected from the group described above. We have found that the choice of solvent is very selective and surprisingly that many common organic solvents are unacceptable. Exemplary of solvents which may be employed herein are (a) linear and cyclic ethers and polyethers such alkyl and cycloalkyl mono and di-ethers of 2 to 12 carbon atoms, such as 1,2-dimethoxyethane (i.e., glyme), 1,4-dioxane, tetrahydrofuran and the like; (b) $C_3$ to $C_8$ alcohols such as isopropanol, t-butanol, sec-butanol and the like, but only in the absence of chloride ions (as explained below): (c) nitriles containing 2 to 6 carbon atoms such as acetonitrile, propionitrile, capronitrile, t-butylcyanide and the like; (d) aromatics and haloaromatics of 1 to 2 rings, such as benzene, toluene, chlorobenzene, bromobenzene, methyl-napthalene, t-butylbenzene and the like in the presence of at least one of (a) or (b); (e) chloroform; (f) trichloroethylene in the presence of at least one of (a) and (b) and (g) mixtures of two or more of the above.

Alcohols of 3 to 8 carbon atoms may be employed as the solvent but only in the absence of chloride ions in the system. It has surprisingly been found that an exchange reaction occurs between ammonium chloride and α-amino-ε-caprolactam free base in alcohol solvents with the formation of the insoluble α-amino-ε-caprolactam hydrochloride which is lost with the insoluble mineral acid salt thereby lowering α-amino-ε-caprolactam yields. Facile separation of the salt from α-amino-ε-caprolactam can only be obtained if chloride ions are not present when utilizing these alcohols as the solvent. Accordingly, in this case, HCl would be eliminated before the neutralization step. With respect to the utilization of aromatics and haloaromatics such terms are meant to include unsubstituted hydrocarbons of 1 to 2 rings or alkyl substituted hydrocarbons of 1 to 2 rings wherein the alkyl radical contains 1 to 4 carbon atoms, and in the case of haloaromatics, having at least 1, preferably 1 to 6 halogen substituents selected from the group consisting of chlorine and bromine attached directly to the ring as opposed to any alkyl side chains. We have also surprisingly found that such aromatics and haloaromatics by themselves, as well as trichloroethylene by itself, are not suitable solvents in the present process either because the ammonium salt is not formed into discrete, non-sticky particles or separation of the α-amino-ε-caprolactam solution from the salt is difficult. However, when such solvents are admixed with at least about 5% by weight, preferably 5 to 25% by weight of an ether, polyether or $C_3$ to $C_8$ alcohol, or mixtures thereof, it has been found that the resultant mixture can be employed in the process of this invention. Exemplary of such mixtures are mixtures of benzene and 5% by weight glyme; toluene and 10% by weight glyme; chlorobenzene and 15% by weight glyme, benzene and 20% by weight isopropanol, etc. Larger amounts of solvents (a) or (b) can be used in the mixture if desired, but such is not considered necessary.

Among the preferred solvents which may be employed herein are glyme, dioxane, isopropanol, acetonitrile, tetrahydrofuran, mixtures of benzene and glyme or isopropanol, mixtures of toluene and glyme or isopropanol, mixtures of chlorobenzene and glyme or isopropanol, chloroform, mixtures of trichloroethylene and glyme or isopropanol and mixtures thereof.

Solvents which have been tried unsuccessfully in the process of this invention include isopropanol in the presence of chloride ions; benzene, toluene, chlorobenzene, trichloroethylene, tetrachloroethylene and methyl pivalate.

To form a solution of the α-amino-ε-caprolactam mixture in the above solvents, the Beckmann rearrangement mixture is preferably added to the solvent while simultaneously adding an excess of anhydrous ammonia to the mixture. The concentration of the resultant α-amino-ε-caprolactam solution may be in the range of about 5 to 35% be weight, preferably about 10 to 25% by weight. These ranges provide adequately concentrated solutions for commerical applications while permitting high yields of the free α-amino-εcaprolactam. The amount of solvent employed consequently is much less than required in the aqueous systems suggested by the prior art described above.

In the practice of this invention as a batch or continuous process, it has been found that the presence of about 0.5 to 2 moles of water per mole of α-amino-ε-caprolactum in the neutralization zone greatly aids in the formation of fine, non-adhering particles of the ammonium salt which are easier to precipitate and separate out. Using less than about 0.5 moles of water, a slight yield loss occurs whereas when more than about 2 moles of water are employed no further advantage results.

The α-amino-ε-caprolactam solution is neutralized in a suitable vessel or container by employing anhydrous ammonia as the neutralizing agent. Preferably, ammonia gas is bubbled through the solution. The molar feed rate of the ammonia gas is adjusted to provide a molar excess of ammonia to hydrogen ion concentration [H+], in the solution so that the solution is alkaline; preferred molar ratios are in the range of about 1.1:1 to 10:1 ammonia to [H+], more preferably about 1.2:1 to 3:1. The purpose of using an excess of ammonia is to form ammonium salt particles which easily precipitate out as well as avoid the formation of insoluble mixed α-amino-ε-caprolactam salts. Neutralization may be carried out at temperatures in the range of about 0° to 60°C. preferably 10° to 30° C. and at pressures in the range of about to 500 psig, preferably at atmospheric pressure to 30 psig. The neutralization temperature can be controlled by means of adequate cooling. Neutralization is preferably conducted under an inert atmosphere, that is, an atmosphere preferably devoid of oxygen and carbon dioxide. As the inert atmosphere there may be employed nitrogen or the inert gases, such as helium, argon and the like.

Upon neutralization, the ammonium salt of the acid or acid moiety employed in the Beckmann rearrangement, such as ammonium sulfate or ammonium phosphate, is formed. Since the ammonium salt (or salts) is insoluble in the solvent, it precipitates out in the form of fine particles. After completion of the neutralization reaction, the ammonium salt is separated from the free α-amino-ε-caprolactam-containing solution by a conventional means, such as filtering, centrifuging and the like.

The resulting filtrate comprises α-amino-ε-caprolactam in its free base form dissolved in a solution of the solvent and a small amount of water. The α-amino-ε-caprolactam may be utilized in this form, for example, in the production of lysine by resolving the α-amino-ε-caprolactum enantiomers and then hydrolyzing to get L-lysine or hydrolyzing and then resolving D,L lysine to obtain L-lysine. The free base α-amino-ε-caprolactam may be recovered from the solution since it is desirable that the aminolactam be in crystal form or in a pure, anhydrous solution prior to subsequent resolution in the process of forming lysine The α-amino-ε-caprolactam may be separated from the solution in the form of crystals or as an anhydrous solution in the solvent by one of several techniques. Examples of the former techniques include crystallizing from the combined solvents by cooling, solvent change-over followed by crystallization, forming insoluble adducts or salts which may be subsequently converted to free α-amino-ε-caprolactam or its salts and like processes. Examples of the latter techniquest include azeotropic distillation of the small amounts of the contained water. Moreover, it may be desirable in some operations to partially recover the α-amino-ε-caprolactam from the solution and recycle the separated solvent containing α-amino-ε-caprolactam and impurities to the neutralization step. In this manner, the impurities which may be present from preceeding steps (such as the formation of α-aminocyclohexanone oxime) can be enriched to facilitate their removal.

The process of this invention provides α-amino-ε-caprolactam as well as other α-amino-ω-lactams in high yields, preferably in anhydrous form. Yields of the α-amino-ε-caprolactam based on the amount of α-amino-ε-caprolactam in the rearranged mixture are in the range of about 90 to 100%, preferably 95 to 100%. Accordingly, it can be seen that the instant process affords a highly efficient manner of isolating α-amino-ε-caprolactam and other α-amino-ω-lactams from the Beckmann rearrangement mixtures. The by-product ammonia salt(s), such as ammonium sulfate, can be filtered off and dried to obtain solvent-free salt. This is in contrast to previously suggested aqueous procedures which yield an aqueous salt solution which must be crystallized to yield the salt.

The following non-limiting examples are given to further illustrate the present invention.

EXAMPLE 1

A 36.58 g sample of a Beckmann rearrangement mixture prepared from 28.11 g of 102% sulfuric acid, 5.98 g (46.65 m mol) of α-amino cyclohexanone oxime and 2.49 g (46.6 m mol) of ammonium chloride was neutralized as follows:

A solution of 1.7 g (94 m mol) of water in 200 cc of glyme in a 500 cc, 3-neck, round bottom flask was stirred with a magnetic stirring bar, while passing anhydrous ammonia gas through the solution. The reaction mixture was then added dropwise to the stirred $NH_3$ saturated glyme with continued $NH_3$ addition. Temperature during the neutralization was maintained at 20°–40°C. via an ice water bath. After the addition was complete, stirring and the $NH_3$ flow were continued for 5 minutes. The ammonium salts were filtered out and reslurried three times with 200 cc portions of glyme through which $NH_3$ is bubbled. After the final wash and filtration, the solids were dried in a vacuum over at 50°C to obtain 40.74 g of ammonium salts. The combined washes and filtrate were flash evaporated at reduced pressure in a Buchler rotating flask evaporator (maximum water bath temperature of about 45°–50°C) to obtain a concentrate (about 100 cc) from which all of the $NH_3$ has been removed.

For analytical purposes, the amount of α-amino-ε-caprolactam in the solution was determined as follows:

The concentrate was diluted with 100 cc of glyme and then cooled in an ice water bath. To the stirred solution was added dropwise an anhydrous HCl saturated glyme solution to a pH of about 2. The resultant α-amino-ε-caprolactam hydrochloride was filtered out, washed on the filter with 100 cc of glyme, and dried in a vacuum over at 50°C to obtain 7.27 g (44.2 m mol) of α-amino-ε-caprolactam hydrochloride (94.8% yield) based on the amount of α-aminocyclohexanone oxime charged to the Beckmann reactor. An analysis of the ammonium salts solids by thin layer chromatography revealed no α-amino-ε-caprolactam and it was concluded that about 100% of the α-amino-ε-caprolactam was dissolved in the glyme. The results are reported in Table 1, below.

EXAMPLE 2

Example 1 was repeated using various solvents. The results are also shown in Table 1.

In the example utilizing isopropanol (Sample 4), HCl was removed from the Beckmann rearranged mixture by flash distillation under a vacuum pressure of 12–15 mm Hg, temperature of 78°–80°C for 30 minutes. An analysis by chloride ion analysis revealed that 4.3 mol % HCl remained.

Table 1

| Sample | Solvent | Extraction times and amounts(ml) | ACL[a] crude % yield | ACL.HCl % yield | Ammonium[b] salt % yield |
|---|---|---|---|---|---|
| 1 | glyme | 3 × 200 | | 94.8 | |
| 2 | glyme | 4 × 200 | 99 | 90 | 101.7 |
| 3 | dioxane | 3 × 150 | 97.3 | 95 | 93 |
| 4 | isopropanol | 4 × 200 | c | 84 | 96 |
| 5 | dioxane | 3 × 150 | 97.3 | 95 | 93 |
| 6 | isopropanol and benzene (2:3 volume ratio) | 1 × 300 1 × 100 | c | 76 | 96 |
| 7 | chloroform | 2 × 200 | 106 | 96.6 | 99.5 |
| 8 | acetonitrile | 3 × 200 | 99 | 86 | 99.5 |
| 9 | chlorobenzene and 5% glyme | 2 × 150ml chlorobenzene 1 × 150 chloroform | | 95.2 | 105 |
| 10 | trichloroethylene + glyme (3:1 volume ratio) | 4 × 200 | 96 | 89 | 100 |
| 11 | trichloroethylene + isopropanol (3:1 volume ratio) | 4 × 200 | | 89.5 | 100 |

[a] ACL = α-amino-ε-caprolactam by evaporation of solution
[b] Ammonium salt was $(NH_4)_2SO_4$ and $NH_4Cl$
[c] Complete removal of solvent from the ACL crude was difficult and not attempted In the above examples, relatively large amounts of solvents were used to insure complete extraction of solids. It has been determined that similar results can be obtained by using smaller amounts of solvent for neutralization and washes. This is particularly true when the solids are washed with hot solvent. For example, the following example demonstrates that the amount of α-amino-ε-caprolactam is almost totally dissolved using small amounts of solvent.

EXAMPLE 3

Example 1 was repeated except that the Beckmann rearrangement mixture yielded about 6g. of α-amino-ε-caprolactam. The temperature in the evaporator was about 30°–35°C. The amount of α-amino-ε-caprolactam removed in each washing was determined. The results are shown in Table 2, below.

Table 2

| Sample | Solvent | Extraction Number | Solvent Volume, ml | Total yield ACL, % |
|---|---|---|---|---|
| 1 | glyme | 1 | 200 | 50.5 |
|   |       | 2 | 200 | 91.3 |
|   |       | 3 | 200 | 95 |
|   |       | 4 | 200 | 99 |
| 2 | dioxane |   |     |    |
|   |         | 2 | 150 | 88 |
|   |         | 3 | 150 | 97.3 |
| 3 | acetonitrile |  |  |  |
|   |              | 2 | 200 | 96 |
|   |              | 3 | 200 | 96 |
| 4 | chloroform | 1 | 200 | 103 |
|   |            | 2 | 200 | 106 |
| 5 | trichloroethylene and glyme (3:1 volume ratio) | 1 | 200 | 59 |
|   |   | 2 | 200 | 70 |
|   |   | 3 | 200 | 92 |
|   |   | 4 | 200 | 96 |

EXAMPLE 4

Example 1 is repeated using free base α-aminocyclohexanone oxime in the Beckmann rearrangement. Glyme is used as the solvent. Yield is over 99.5% of α-amino-ε-caprolactam dissolved in the solvent.

EXAMPLE 5

For comparison, Example 1 was repeated separately using benzene, toluene, chlorobenzene, trichloroethylene, tetrachloroethylene and methyl pivalate. In each case, a sticky mass was formed which prevented further stirring and prevented the ammonia from penetrating for neutralization.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A process for separating an α-amino-ω-lactam of the formula:

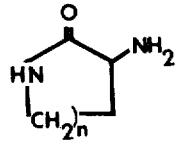

wherein n is an integer from 0 to 12 in its free form from the rearranged mixture obtained by the Beckmann rearrangement of an α-aminocycloalkanone oxime of the formula

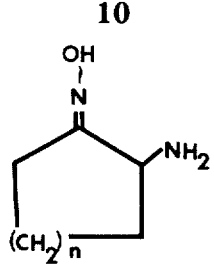

wherein n has the meaning given above, which process comprises the steps of contacting said rearranged mixture with a solvent selected from the group consisting of
  a. linear and cyclic ethers and polyethers;
  b. $C_3$ to $C_8$ alcohols, in the absence of chloride ions;
  c. nitriles containing two or more carbon atoms;
  d. aromatics and haloaromatics in the presence of at least one of said (a) or (b), wherein the halosubstituent is chlorine or bromine attached directly to the aromatic ring;
  e. chloroform;
  f. trichloroethylene in the presence of at least one of said (a) or (b), and
  g. mixtures of two or more of the above, while simultaneously neutralizing the resultant solution with an excess of anhydrous ammonia based on the hydrogen ion concentration in said solution, whereby an insoluble precipitate is formed; and separating said solution containing said α-amino-ω-lactam in its free form from said precipitate.

2. The process of claim 1 wherein n is an integer from 1 to 8.

3. The process of claim 1 wherein said α-amino-ω-lactam is α-amino-ε-caprolactam and said α-aminocycloalkanone oxime is α-aminocyclohexanone oxime.

4. The process of claim 1 wherein the molar ratio of anhydrous ammonia to said hydrogen ion concentration is about 1.1:1 to 10:1.

5. The process of claim 1 wherein about 0.5 to 2 moles of water per mole of α-amino-ω-lactam are present in the neutralization zone.

6. The process of claim 1 wherein said process is a continuous process.

7. The process of claim 1 wherein said solvent is selected from the group consisting of glyme, dioxane, isopropanol, acetonitrile, tetrahydrofuran, mixtures of benzene and glyme or isopropanol, mixtures of toluene and glyme or isopropanol, chloroform, trichloroethylene and glyme or isopropanol, and mixtures thereof.

8. The process of claim 7 wherein said α-amino-ω-lactam is α-amino-ε-caprolactam and said α-aminocycloalkanone oxime is α-aminocyclohexanone oxime.

9. The process of claim 8 wherein the concentration of said α-amino-ε-caprolactam in said solvent is in the range of about 5 to 35% by weight.

10. The process of claim 8 wherein anhydrous ammonia gas is bubbled into said solution to neutralize the same.

11. The process of claim 1 including the further step of recovering said α-amino-ω-lactam from said α-amino-ω-lactam-containing solution.

12. The process of claim 3 including the further step of recovering said α-amino-ε-caprolactam from said α-amino-ε-caprolactam containing solution.

13. The process of claim 3 wherein said solvent is glyme.

14. The process of claim 3 wherein said solvent is dioxane.

* * * * *